United States Patent
Gandy

(10) Patent No.: US 8,362,641 B2
(45) Date of Patent: Jan. 29, 2013

(54) DISTRIBUTED WIND TURBINE ELECTRIC GENERATION SYSTEM

(75) Inventor: Charles Rex Gandy, Austin, TX (US)

(73) Assignee: Independence Wind Power, LLC, Austin, TX (US)

( * ) Notice: Subject to any disclaimer, the term of this patent is extended or adjusted under 35 U.S.C. 154(b) by 593 days.

(21) Appl. No.: 12/395,636

(22) Filed: Feb. 28, 2009

(65) Prior Publication Data

US 2009/0224606 A1 Sep. 10, 2009

Related U.S. Application Data

(60) Provisional application No. 61/067,561, filed on Feb. 29, 2008.

(51) Int. Cl.
*H02J 3/00* (2006.01)
(52) U.S. Cl. .......................................................... 307/43
(58) Field of Classification Search .................... 307/43
See application file for complete search history.

(56) References Cited

U.S. PATENT DOCUMENTS

| | | | |
|---|---|---|---|
| 4,285,636 | A | 8/1981 | Kato |
| 5,252,029 | A | 10/1993 | Barnes |
| 6,864,597 | B1 | 3/2005 | Ricker |
| 7,071,579 | B2 | 7/2006 | Erdman |
| 7,109,599 | B2 | 9/2006 | Watkins |
| 7,501,713 | B2 | 3/2009 | Fein |
| 7,606,638 | B2 * | 10/2009 | Fortmann et al. ............. 700/287 |
| 7,633,177 | B2 * | 12/2009 | Platt ................................ 290/54 |
| 2005/0230980 | A1 | 10/2005 | Brunet |
| 2007/0013194 | A1 | 1/2007 | Calley |
| 2007/0110579 | A1 * | 5/2007 | Ross, Sr. .................... 416/132 B |
| 2007/0231139 | A1 | 10/2007 | Yokoi |
| 2007/0241567 | A1 | 10/2007 | Platt |
| 2008/0286112 | A1 | 11/2008 | Rowan |

FOREIGN PATENT DOCUMENTS

| | | |
|---|---|---|
| JP | 2006061319 A | 10/2006 |
| KR | 20020013243 | 2/2002 |
| WO | WO 03/064852 A1 | 8/2003 |
| WO | WO 2006125118 A3 | 11/2006 |

OTHER PUBLICATIONS

PCT/US2009/035610 International Search Report and Written Opinion fo the International Searching Authority, Jul. 31, 2009 (11 pages).

(Continued)

*Primary Examiner* — Hal Kaplan
(74) *Attorney, Agent, or Firm* — Matheson Keys Garsson & Kordzik PLLC; Terry M. Keys

(57) ABSTRACT

A distributed electric generation system having a plurality of wind turbine generators for converting wind energy into low voltage AC electric power, wherein each of the wind turbine generators has a wind rotor having a vertical axis of rotation which rotates in response to the wind, a rotatable shaft driven by said wind rotor, and an electric generator connected to the rotating drive shaft for generating low voltage AC electric power in response to the rotation of the wind rotor by the wind. The generation system also includes a plurality of pole mounting assemblies for mounting each of the plurality of wind turbine generators on a plurality of poles within the existing right of way of an electrical distribution system of an electric power grid; and a plurality of transformers electrically connecting the electric generators with the electrical distribution system for transforming the low voltage electric power generated by the electric generators into medium voltage AC electric power that is compatible with the existing electrical distribution system.

21 Claims, 8 Drawing Sheets

OTHER PUBLICATIONS

PCT/US2009/035610 International Preliminary Report on Patentability, Sep. 10, 2010 (10 pages).

PacWind Vertical Axis Wind Turbine product web site, downloaded Feb. 16, 2009, www.pacwind.net/products.html (5 pages).

Park, J-Y, et al., "A Novel Vertical Axis Wind Turbine for Distributed & Utility Deployment," A Novel Vertical-Axis Wind Turbine for Distributed & Utility Deployment, Dept. of Mechanical Engineering, Ilnha University, Korea KR Wind Energy Research Institute, Korea KR Windpower, Inc., U.S.A., Inha University, Korea KR Wind Energy Research Institute, Korea KR Windpower, Inc., U.S.A., (11Pages).

Galbraith, K., "Assessing the Value of Small Wind Turbines," NY Times, Sep. 4, 2008, https://www.nytimes.com/2008/09/04/business/04wind.html?scp=1&sq=Assessing%20The%20Value%20Of%20Small%20Wind%20Turbines,%22&st=cse (4 Pages).

Four Seasons Windpower web pages, downloaded Feb. 20, 2009, http://www.fswturbvines.com/vwtpics.html (8 pages).

Bergey, M., "Small Wind Turbines: Primer", http://www.altestore.com/howto/Wind-Power/Getting-Started/Small-Wind-Turbines-Primer/a28/, downloaded Feb. 17, 2009 (5 pages).

Quiet Revolution QR5 wind turbine product web site, http://www.quietrevolution.com/qr5-turbine.htm, downloaded Feb. 16, 2009, (3 pages).

Sunny Boy Inverter product data sheet, downloaded Feb. 2009 (2 pages).

Rattigan, D, "Utility Poles Offer Small-Scale Wind Power," The Boston Globe, Jan. 11, 2009, http://www.boston.com/news/local/massachusetts/articles/2009/01/11/utility_poles_offer_small_scale_wind_power (3 pages).

"Wind Electricity Basics," Wind Power Magazine, http://homepower.com/basics/wind (7 pages).

"Wind Power from Utility Poles?" Ask Metafilter, downloaded Feb. 17, 2009, http://ask.metafilter.com/57848/Wind-power-from-utility-poles (5 pages).

Wikipedia.org entry for Wind Turbine, 10 pages, https://secure.wikimedia.org/wikipedia/en/wiki/Wind_Turbine, downloaded Feb. 21, 2009.

* cited by examiner

POLE MOUNT ASSEMBLY

POLE MOUNT ASSEMBLY

DISTRIBUTED WIND TURBINE ELECTRIC GENERATION SYSTEM

CROSS-REFERENCE TO RELATED APPLICATION

This application claims priority pursuant to 35 U.S.C. 119 to provisional U.S. Patent Application Ser. No. 61/067,561 entitled "POLE MOUNT ASSEMBLY" filed Feb. 29, 2008.

FIELD OF INVENTION

The present invention relates in general to wind turbine electric generation systems and particularly to linear distributed wind turbine electric generation systems.

BACKGROUND OF INVENTION

Wind power has been a local source of energy for centuries. In the United States, the invention of the mechanical windmill in the 19th century allowed the settlement of much of the American frontier and still remains a localized source of power for farms and ranches. Beginning in the 1920s rural families used small wind turbine electric generators to power their homes. Following the enactment of the Rural Electrification Act in the 1930s and the creation of rural electric cooperatives for bringing dependable electric power to rural areas, governmental policies favored the design and construction of large centralized, primarily fossil-fueled fired, electric generation facilities which distributed electric power to rural areas over a large transmission and distribution grid. These governmental policies effectively crippled the market for small wind turbine electric power generation in the United States until the oil crisis in the late 1970s. For approximately 10 years following the passage of PURPA in the late 1970s, tax credits and favorable federal regulations created a new market for small wind powered electric generation systems for rural homes, farms and ranches. When the tax credits ceased to be available and the price of oil declined in the late 1980s, small wind turbine businesses were again driven out of business.

The demand for electric power continues unabated. As a result of the rapid increase in oil and natural gas prices since the late 1990s, the growing awareness that emissions from fossil-fuel sources is the likely cause of global warming, and the need for energy independence for national security reasons, there has been an increased demand for cost-effective electric power generated from renewable resources, such as wind and solar. In response to this demand and innovations in wind turbine design and efficiency, large utility-scale wind turbine electric generator farms ("big wind") have been constructed in remote areas of the country with high wind potential. This increasingly competitive source of energy is steadily providing a growing share of U.S. electricity—without consuming any natural resource or emitting any pollution or greenhouse gases. Wind energy generation is growing rapidly throughout the U.S. Wind energy has been growing 29% annually from 2002 to 2007 and the installed wind energy generating capacity is now over 20,000 MW (estimated by the end of 2008). Wind power currently supplies 1% of the nation's electricity, but is estimated to be capable of providing as much as 20% by 2020. The top five states in installed wind power capacity are: Texas, California, Iowa, Minnesota, and Washington. The top twelve states in wind energy potential are: North Dakota, Texas, Kansas, South Dakota, Montana, Nebraska, Wyoming, Oklahoma, Minnesota, Iowa, Colorado and New Mexico. American Wind Energy Assoc., "*Wind Energy Basics*", February 2007, and related publications in 2008 and 2009.

When most Americans think of wind power, they think of "big wind". Big wind power is generated by utility scale turbines. Many of these wind turbines have blades over 40 meters wide, meaning the diameter of the rotor is over 80 meters (nearly the length of a football field), mounted on towers 80 meters tall. These types of turbines can produce 1.8 Megawatts (MW) of power. The current wind farm model is to place a large number of these utility scale wind turbines in one central location.

Such "big wind" farms, however, have disadvantages. The wind turbines are very expensive. They have to be located in areas of high wind potential. Land for the wind farm has to be purchased or leased. In addition, the big wind developer has to purchase transmission line easements from the wind farm to the existing transmission power grid. As a result, the development time is long and costs are very high. Because of these restrictions many new big wind farms cannot be built for six to ten years. In addition, such big wind farms are typically located remotely from the large urban areas experiencing the most rapid growth in the demand for electricity. The transmission of such big wind-generated electric power over long distances has taxed the existing transmission grid to its limits, thereby adding to the nation's already most pressing energy and electric power problems, including blackouts and brownouts, energy security concerns, power quality issues, tighter emissions standards, transmission bottlenecks, and the desire for greater control over energy costs. These transmission grid problems have constrained the development of big wind farms until either developers or governmental entities build new transmission capacity over long distances. This will require both huge capital investment and very long development cycles because of the need to purchase additional "rights-of-way" or easements for the new transmission lines. Such delays and capital investment substantially increase the per kwh costs of energy to the consumer, thereby making "big wind" generated electric power more expensive.

In addition, many rural areas of the country do not have high wind potential and are not along the transmission lines from existing big wind projects to the major urban areas. As a result, big wind farms do not provide a solution to their increasing demand for electric power, which is necessary for such rural areas to compete with urban centers for new economic development opportunities.

Currently, a majority of the states and the District of Columbia have adopted a Renewables Portfolio Standard (RPS) to ensure that a growing percentage of electricity is produced from renewable resources. (Source: American Wind Energy Association, Fact Sheets, http://www.awea.org/pubs/factsheets/RPS_Fact_Sheet.pdf). Many electric utilities, including rural electric cooperatives, will have difficulty meeting these RPSs with only "big wind" and solar solutions.

Many electric utility companies, such as rural electrical cooperatives, who do not presently generate their own electric power, are caught in the middle of energy supply and demand. They have no control over rising energy costs and often face political mandates or customer demands for renewable energy without having any control over how to provide such energy. Accordingly, there is a need for electric utility companies to find a cost-effective way to:
- Create and distribute their own renewable energy locally
- Reduce their dependency on centralized electric energy generation
- Reduce the use of fossil fuel in the generation of electric power Meet their customer and/or state mandates in highly visible way
Reduce the price of electricity
Generate a new revenue stream
Implement a solution using existing property, right-of-way and infrastructure

SUMMARY OF INVENTION

Briefly, the present invention provides a novel distributed electric generation system having a plurality of wind turbine generators for converting wind energy into low voltage AC electric power, wherein each of the wind turbine generators has a wind rotor having a vertical axis of rotation which rotates in response to the wind, a rotatable shaft driven by said wind rotor, and an electric generator connected to the rotating drive shaft for generating low voltage AC electric power in response to the rotation of the wind rotor by the wind. The distributed generation system also includes a plurality of pole mounting assemblies for mounting each of the plurality of wind turbine generators on a plurality of poles within the existing right of way of an electrical distribution system of an electric power grid; and a plurality of transformers electrically connecting the electric generators with the electrical distribution system for transforming the low voltage electric power generated by the electric generators into medium voltage AC electric power that is compatible with the existing electrical distribution system.

The pole mount assembly is used to mount the wind turbine generator, at a plurality of different longitudinal positions on a pole erected substantially vertically to the ground by supporting the turbine race assembly of the wind rotor. The pole mount assembly may include a turbine race assembly platform attachable about the axis of the pole at a plurality of different longitudinal positions from the ground for supporting the turbine race assembly. The pole mount assembly also includes support sections for supporting the turbine race assembly platform and first set of attachments for securing the support sections to the pole. The pole mount assembly also includes second attachments for securing the bottom race disk of the turbine race assembly to the assembly platform.

The pole mount assembly may include a platform for supporting an electric generator that generates electric power in response to the rotation of the wind rotor by wind energy, a support section for supporting the platform, and third set of attachments for securing the electric generator platform to the pole. The pole mount assembly may also include a first drive shaft having gear teeth at a first and second end, wherein the first gear teeth interlock with the gear teeth of the rotatable top race disk and the second gear teeth interlock with the gear teeth of the second drive shaft of the electric generator such that the first drive shaft rotates in response to the rotation of the top race assembly of the wind rotor by wind energy; the second drive shaft spins the drive shaft of the electric generator in response to the rotation of the first drive shaft, thereby causing the electric generator to generate electric power in response to the rotation of the wind rotor by wind energy.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE ILLUSTRATIVE EMBODIMENTS

The principles of the present invention and their advantages are best understood by referring to FIGS. 1-8.

In the following descriptions and examples, specific details may be set forth such as specific quantities, sizes, etc., to provide a thorough understanding of the presented embodiments. However, it will be obvious to those of ordinary skill and creativity in the art that the embodiments may be practiced without such specific details. In many cases, details concerning such considerations and the like have been omitted inasmuch as the details are not necessary to obtain a complete understanding of any and all the embodiments and are within the skills and creativity of persons of ordinary skill in the relevant art.

Figure 1:
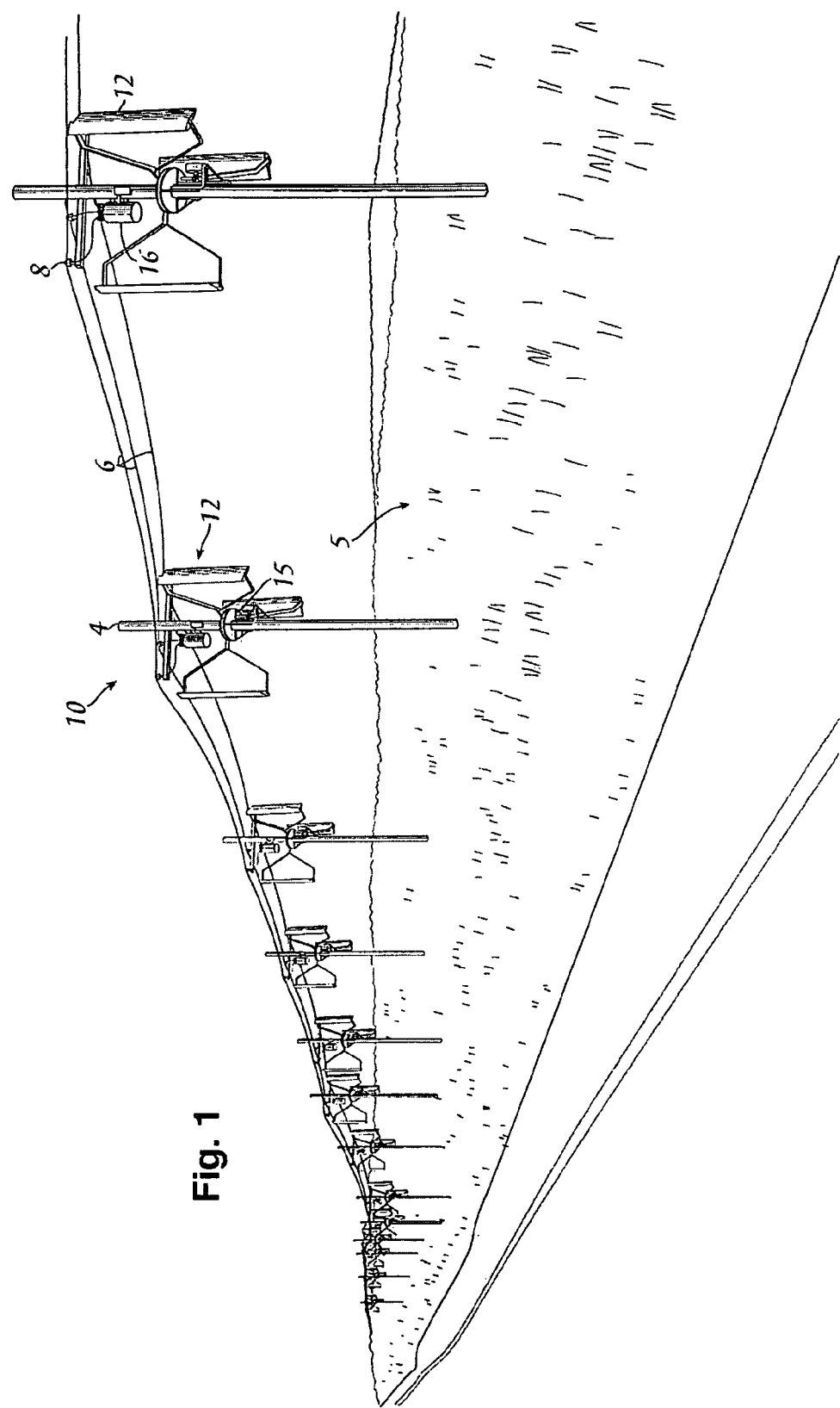
FIG. 1 is a perspective view of one embodiment of the distributed wind-powered electric generation system which has been constructed within the right-of-way of an electrical distribution system of an electric power grid.

FIG. 1 illustrates one embodiment of a wind-powered distributed electric generation system ("distributed generation system" or "linear wind farm") 10 constructed and operated within the right of way of an electrical distribution system of an electric power grid used to distribute electric power from one or more existing electric power sources to consumers (the "load") of the electric power. The electrical distribution system is typically operated by a utility, such as an investor-owned utility or a rural electric cooperative as they typically control the placement of improvements in the right-of-way. The electrical distribution system typically includes utility poles 4 erected in a utility right-of-way substantially parallel to the longitudinal direction of the right-of-way. The utility poles are typically constructed of treated wood or metal of conventional design. Multiple electric power lines 6 for transmitting medium voltage ("MV") three phase alternating current ("AC") electric power through the right of way are mounted to each of the utility poles 4 with the use of conventional insulators 8. Typically, the voltage of the distributed electrical power in medium voltage ("MV") distribution systems is between approximately 12.5 kilovolts and 33 kilovolts ("kV"). In contrast, the typical voltage on long distance "transmission" lines is approximately 110 kV or higher.

In one embodiment, the distributed generation system 10 includes multiple wind turbine generators 12 and pole mount assemblies 15 for mounting the wind turbine generators on the poles 4 between the ground 5 and the overhead power lines 6. Such wind turbine generators 12 typically convert wind energy into low voltage AC electric power. The electric power output from each of the wind turbine generators 12 is then electrically connected as hereinafter described to a step-up transformer 16 for transforming the low voltage AC electric power into MV electric power that is compatible with the frequency and voltage of the power lines 6 of the electrical distribution system.

Although FIG. 1 illustrates the wind turbine generators being mounted on every utility pole, the wind turbine generators are not necessarily mounted on every pole in order to fall within the scope of the invention. For various engineering, technical or business reasons, the turbine generators may be mounted on every second or third pole. For example, the turbines may not be mounted on every pole because the wind wake from the operation of one turbine could interfere with the operation of a turbine if it was placed on the immediately adjacent pole. In addition, a pole located at a turn in the distribution line may not be a suitable pole for the mounting of a turbine.

Figure 2:
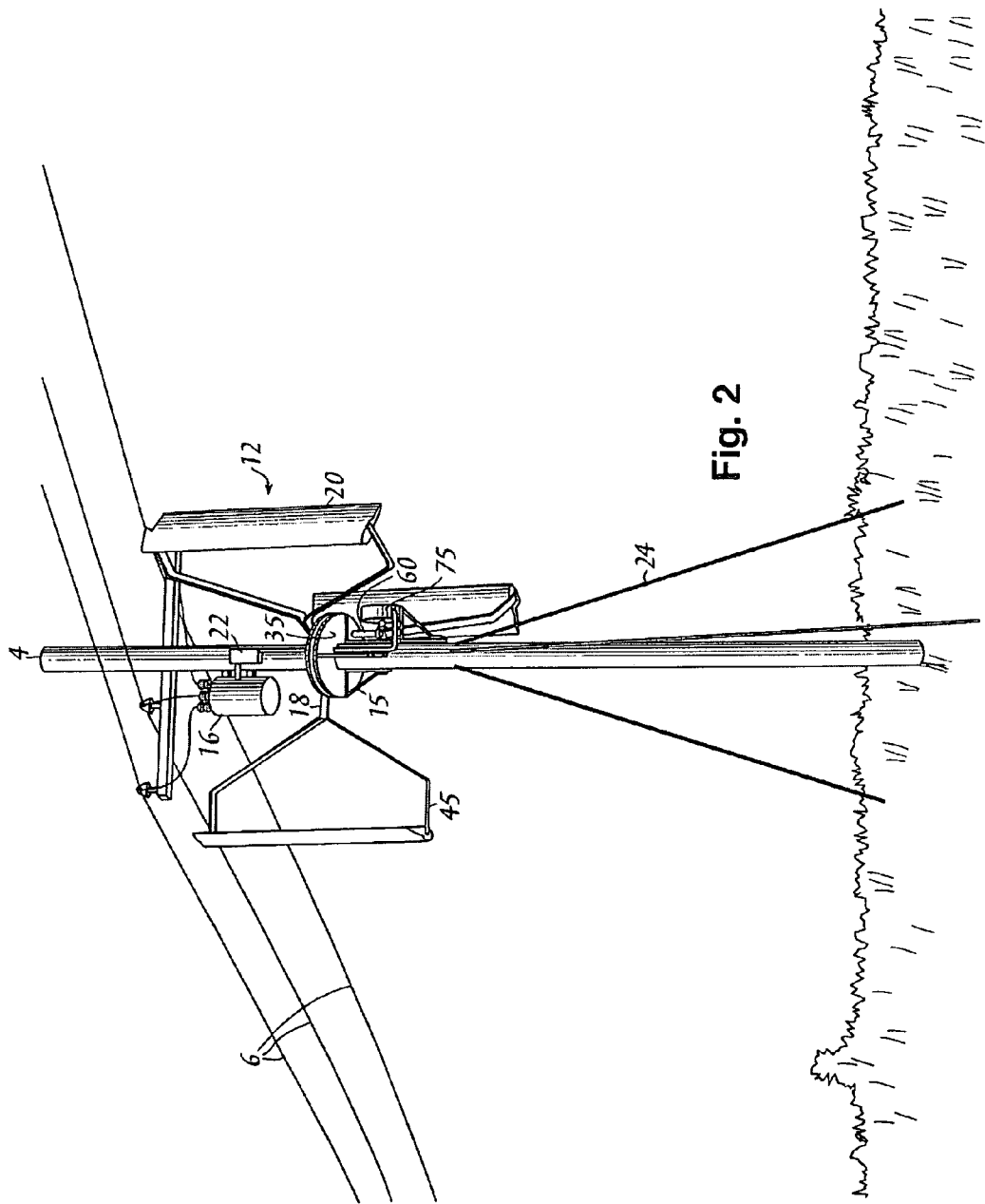
FIG. 2 is an illustration of one of the wind turbine generators of the distributed electric generation system of FIG. 1 mounted on a utility pole showing the wind turbine generator in more detail.

FIG. 2 depicts a wind turbine generator mounted on the pole 4 in FIG. 1 in more detail. In FIG. 2, the wind turbine generator 12 is a vertical axis wind turbine ("VAWT") generator that includes a wind rotor assembly 18. The wind rotor assembly 18, in turn, includes turbine blades 20 connected to a turbine race assembly 35 by respective support arms 45. The turbine race assembly 35 includes a stationary disk (136 in FIG. 6) and a rotating disk (138 in FIG. 6) and is mounted around the pole such that the rotating disk is free to rotate around pole 4, as shown in more detail in FIG. 6. The rotating disk of the race assembly, in turn, drives a rotatable drive shaft 60 longitudinally secured to the pole 4 below the race assembly 35. The drive shaft 60, in turn, drives the rotating shaft of an electric generator 75 for transferring the rotation of the rotating disk to the rotating shaft of the generator 35. In this manner the wind energy imparted to the rotation of the wind rotor via the blades 20 is transferred via drive shaft 60 to electric generator 75 for generating low voltage AC electric power. Because the voltage and frequency produced by the generator 75 vary with wind speed, the output of the electric generator 75 is connected via a power line to a suitable inverter 22 for adapting, including synchronizing the frequency and waveform) of the electric power generated by the electric generator 75 such that the output is compatible with the voltage of the electrical distribution system. A suitable inverter is the Sunny Boy SB7000US inverter manufactured by Sunny Boy and sold through SMA America, Inc., although other inverters of conventional design may be used. The output of the inverter 22 is then electrically connected to the step-up transformer 16 which transforms the low voltage AC electric power into MV AC electric power that is compatible with the electrical distribution system.

Although most utility poles 4 presently used in MV electrical distribution systems can support the additional weight of the wind turbine generators 12, multiple guy wires 24 may be connected between the pole and the ground to increase the stability of the wind turbine generator.

Suitable wind turbine generators include those presently designed and manufactured for used in the "small wind" space, which is commonly defined as turbine generators with rated power capacities to produce up to 100 kilowatts. Small wind turbine generators have historically been defined as wind-powered electric systems sized for homes, farms, schools and small businesses. Preferably, the VAWT wind turbine generator is an omni-directional, low wind speed wind turbine generator that may be readily installed practically anywhere with good wind exposure. The wind rotor assembly 18 includes at least three wind turbine blades 20. The wind turbine blades may be are preferably designed for the rotor assembly 18 to self-start in low wind speeds ("cut-in wind speed") and can self regulate the rotational speed of the blades in mid-to-high wind speeds. Low wind speeds for the purposes of such small wind turbines are typically wind speeds below eight (8) miles per hour ("mph").

Because the above-described small wind turbine generators are typically designed to be mounted onto the top of poles specially designed for such wind turbines, the generator is designed and constructed to be in a direct drive relationship with the wind rotor and the generator commonly is of a pancake configuration. Accordingly, the wind turbine generators need to be adapted or modified for mounting the turbine generator at other locations on the pole, particularly on existing poles which have power lines connected to the top end of the pole. The wind rotor assembly of wind turbine generators commonly has two major components, the blades and a hub. In order to mount these turbine generators at positions on the pole other than the top, the hub of the off-the-shelf turbine generators is replaced by a rotor race assembly 35. Each end of the wind blade 20 is then mechanically connected by wind turbine arms 45 to the turbine race assembly 35. The turbine race assembly 35 may be mounted onto the pole and supported by the pole mount assembly 15 as will be described in more detail hereinafter in connection with FIGS. 5, 6 and 7.

Suitable three blade wind turbine generators are the Delta I (2 kW) wind power generator or the Delta II 10 kilowatt (kW) wind turbine generators previously manufactured by PacWind, Inc. (now WePOWER, LLC) of Torrance Calif. and the Eagle I (2 kW) wind turbine generator presently being manufactured by WePOWER, LLC of Torrance, Calif., modified as described herein below so that it can be mounted on the utility pole between the ground and the distribution power lines 6 with the wind rotor 18 rotatable around the utility pole. Other VAWT wind turbine generators of different rotor assembly designs, with differing number of blades, and of varying power output may be used as will be described in more detail in connection with FIG. 8.

Figure 3:
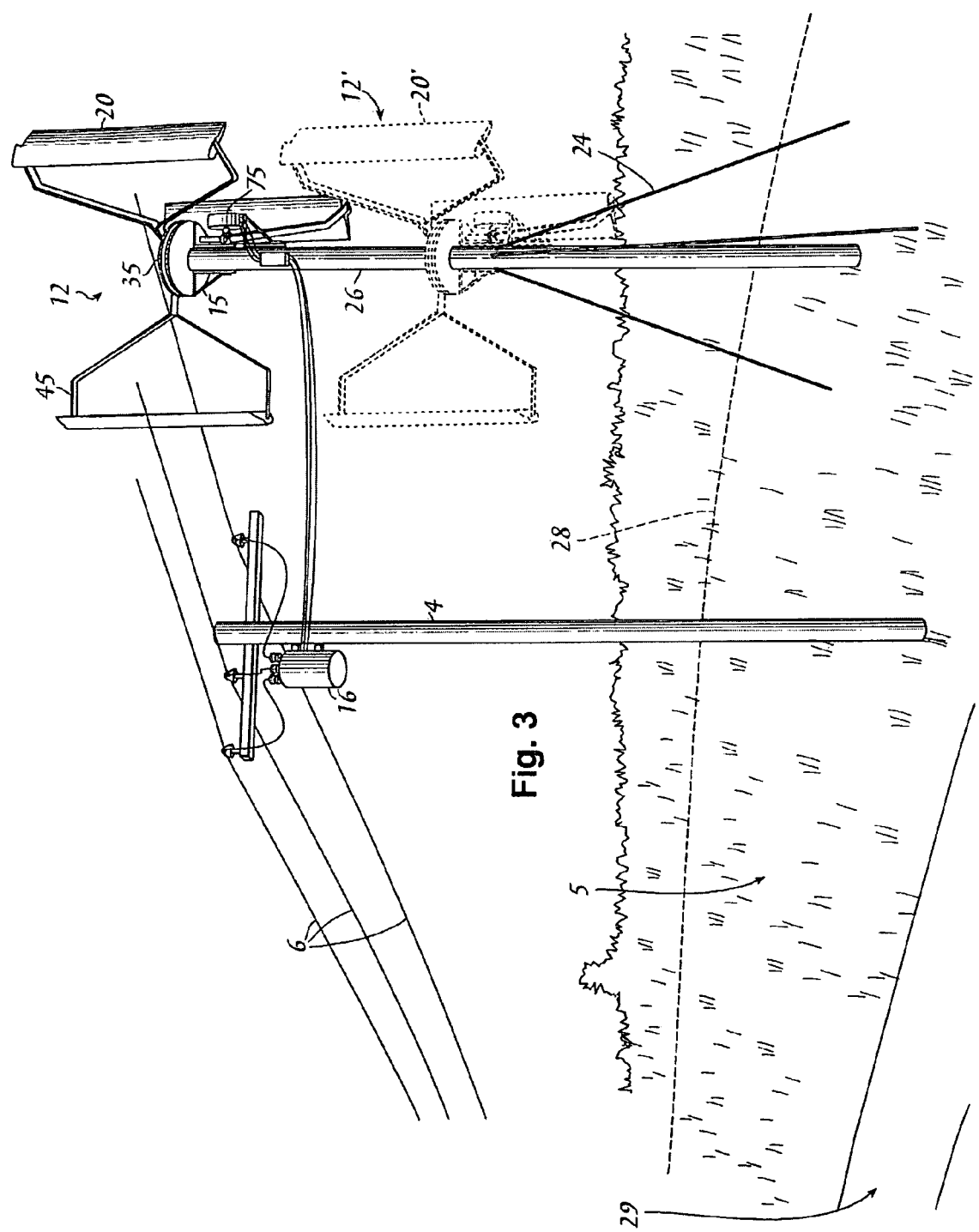
FIG. 3 is an illustration of one of the wind turbine generators of another embodiment of the distributed electric generation system wherein the wind turbine generator is mounted on a pole adjacent to the utility pole of the electrical distribution system.

In an alternative embodiment of the distributed electric generation system 10 shown in FIG. 3, each of the wind turbine generators 12 are mounted on suitable poles 26 of conventional design erected substantially vertically to the ground adjacent to the utility poles 4 that supports the electrical distribution system. The distance between the utility pole and the adjacent pole should be sufficient for the wind rotors to rotate without interfering with the existing distribution power lines 6. Preferably, the poles 26 are mounted within the existing right-of-way 28 between a roadway 29 and an exterior boundary shown as a dotted line typically substantially parallel to the line created by the utility poles of the electrical distribution system as most rural right-of-ways are sufficiently wide that such poles 22 may be erected without the need to seek wider easements from neighboring landowners.

As shown in FIG. 3, the pole mount assembly 15 may be used to mount the wind turbine generator 12 on the adjacent pole 26 at several alternative positions. For example, the wind turbine generator 12 may be mounted on or near the top of the pole 26. Alternatively as shown by the wind turbine generator 12' in dotted lines, the wind turbine generator may be mounted at a suitable distance above the ground but lower than the power lines 6 of the adjacent electrical distribution system. Guy wires 24 may be used to further stabilize the pole 26 on which the wind turbine generator is mounted.

In yet another embodiment, multiple wind turbine generators 12 may be mounted on the adjacent pole 26. In this embodiment, the pole 26 may be longer and/or stronger than the utility pole 4 adjacent to it. One wind turbine generator may be mounted at or near the top of the pole 26, for example within approximately the top 10% of the pole, and, depending on the height and strength of the pole 26, other wind turbine generators may be mounted above the ground but lower than the wind turbine generator mounted at or near the top of the pole. In the last two alternative embodiments the output of the inverter associated with a wind turbine generator may be connected to a step-up transformer 16 mounted on the nearby utility pole.

In connection with the alternative embodiment depicted in FIG. 3 of multiple turbine generators, the output from two or more electric generators 75 may be connected through a single inverter on the pole and the output of this single inverter electrically connected to a transformer 16, thereby reducing the number of inverters and transformers needed to connect the output of multiple turbine generators to the electrical distribution system.

Figure 4:
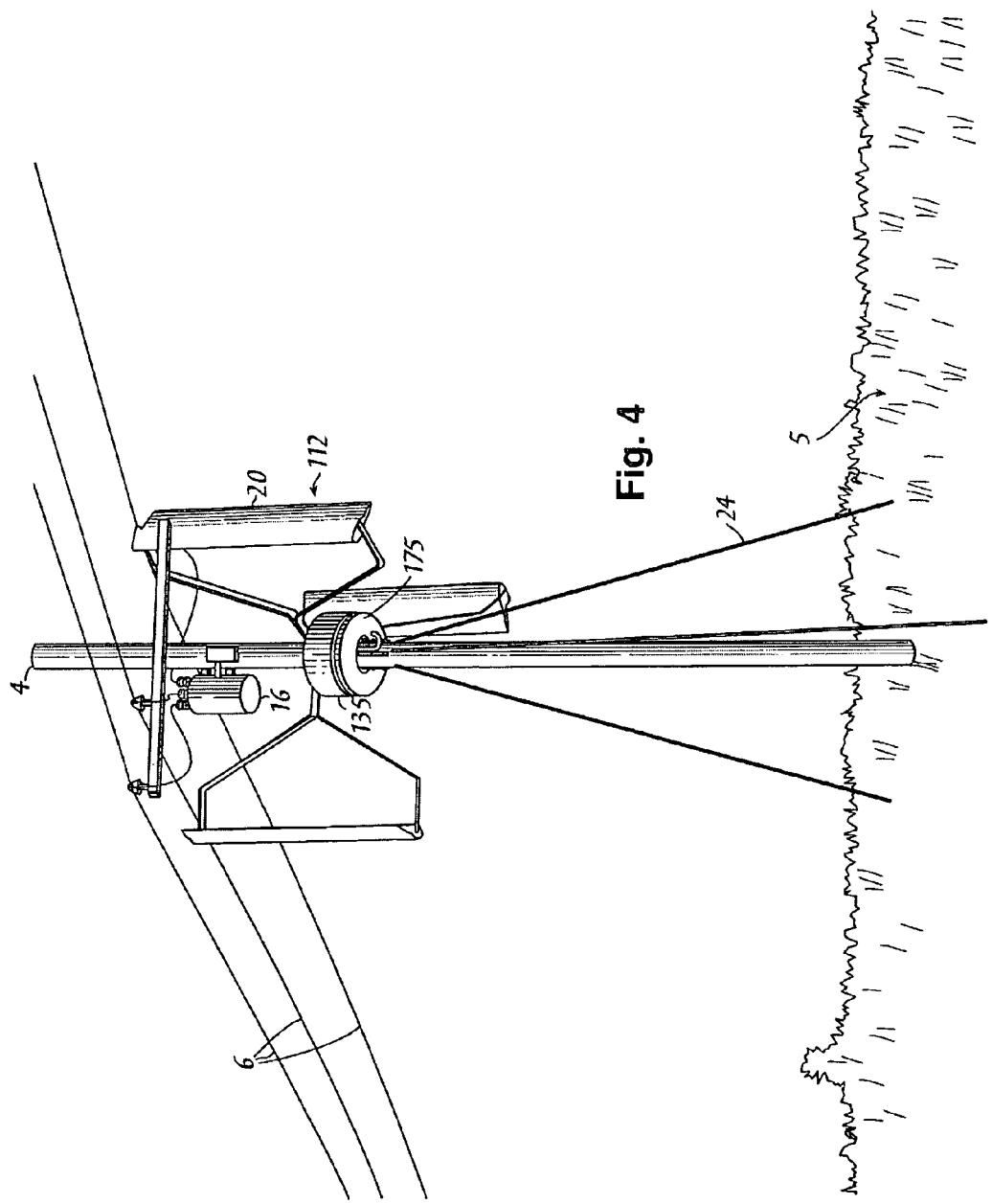
FIG. 4 is an illustration of another embodiment of a wind turbine generator that may be used with the distributed electric generation system wherein the electric generator is a ring-shaped or donut-shaped electric generator mounted in a direct drive relationship with the wind rotor assembly of the wind turbine generator.

FIG. 4 depicts an alternative wind turbine generator 112 especially designed for mounting the wind turbine generator 112 at multiple different positions on an existing utility pole. The electric generator 175 is a ring-shaped or donut-shaped electric generator which can be fitted around the pole 4. By using such a generator 175, the generator 175 may be mounted below a turbine race assembly 135. If this alternative wind turbine generator 112 is used, the portions of the pole mount assembly 15 shown in FIG. 2 needed to support an electric generator 75 in an indirect drive relationship as hereinafter described in FIGS. 5-7 are not needed.

Figure 5:
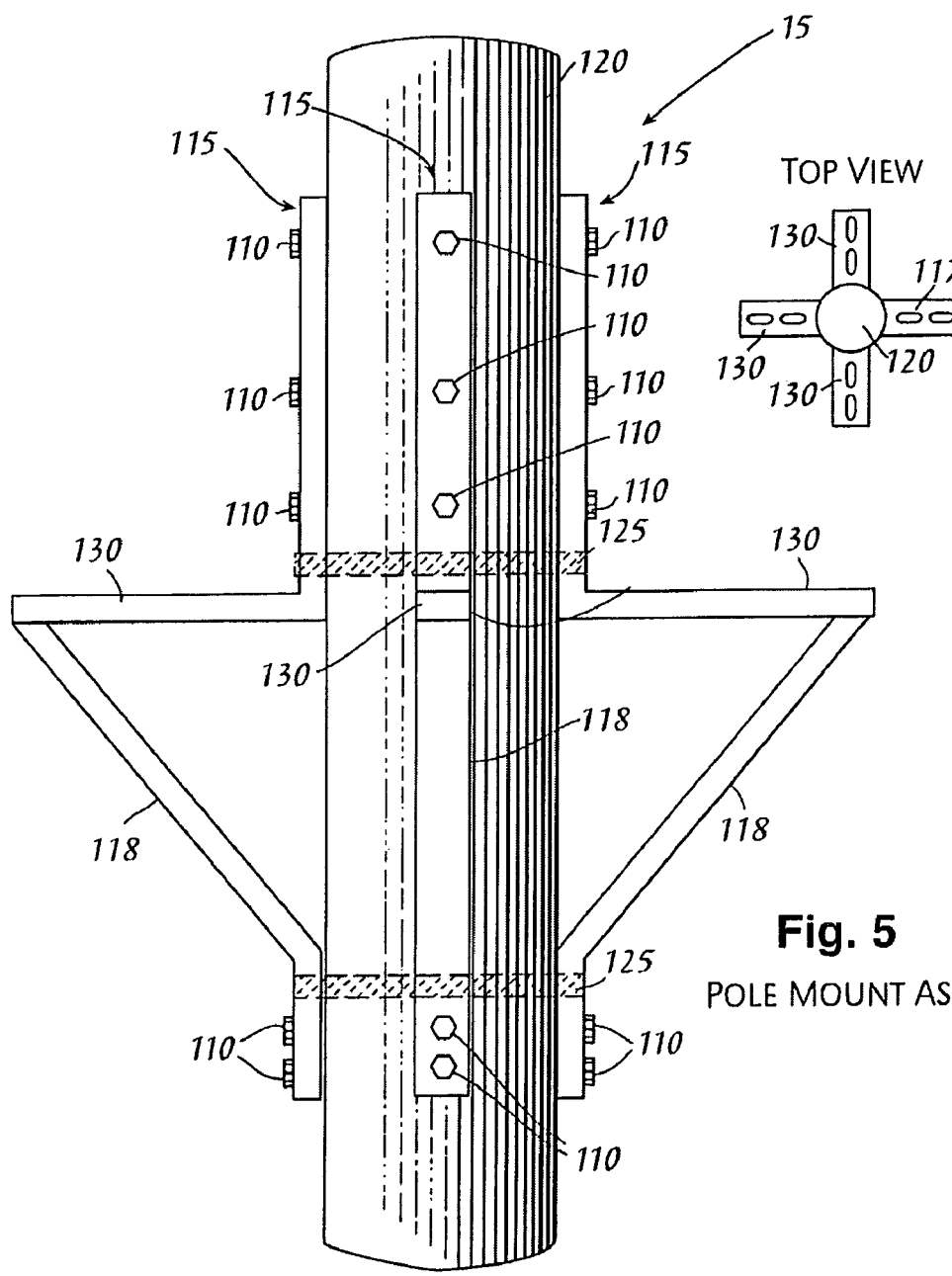
FIG. 5 is a side view of the pole mount assembly used in mounting the electric turbine generator on a pole actually attached to the pole.
Figure 6:
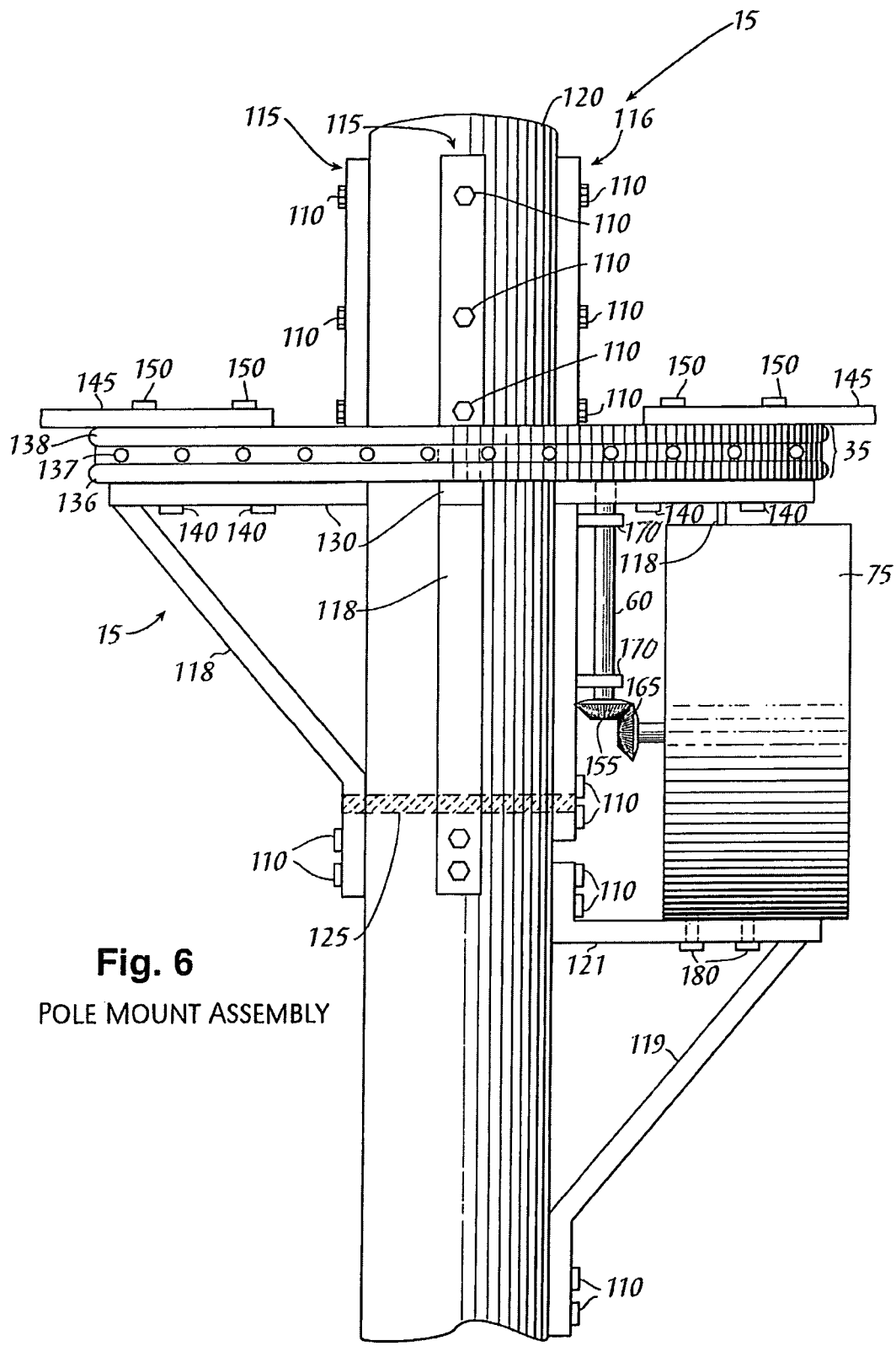
FIG. 6 is a side view of the attached pole mount assembly of FIG. 5 with the turbine race assembly and electric generator mounted thereto.
Figure 7:
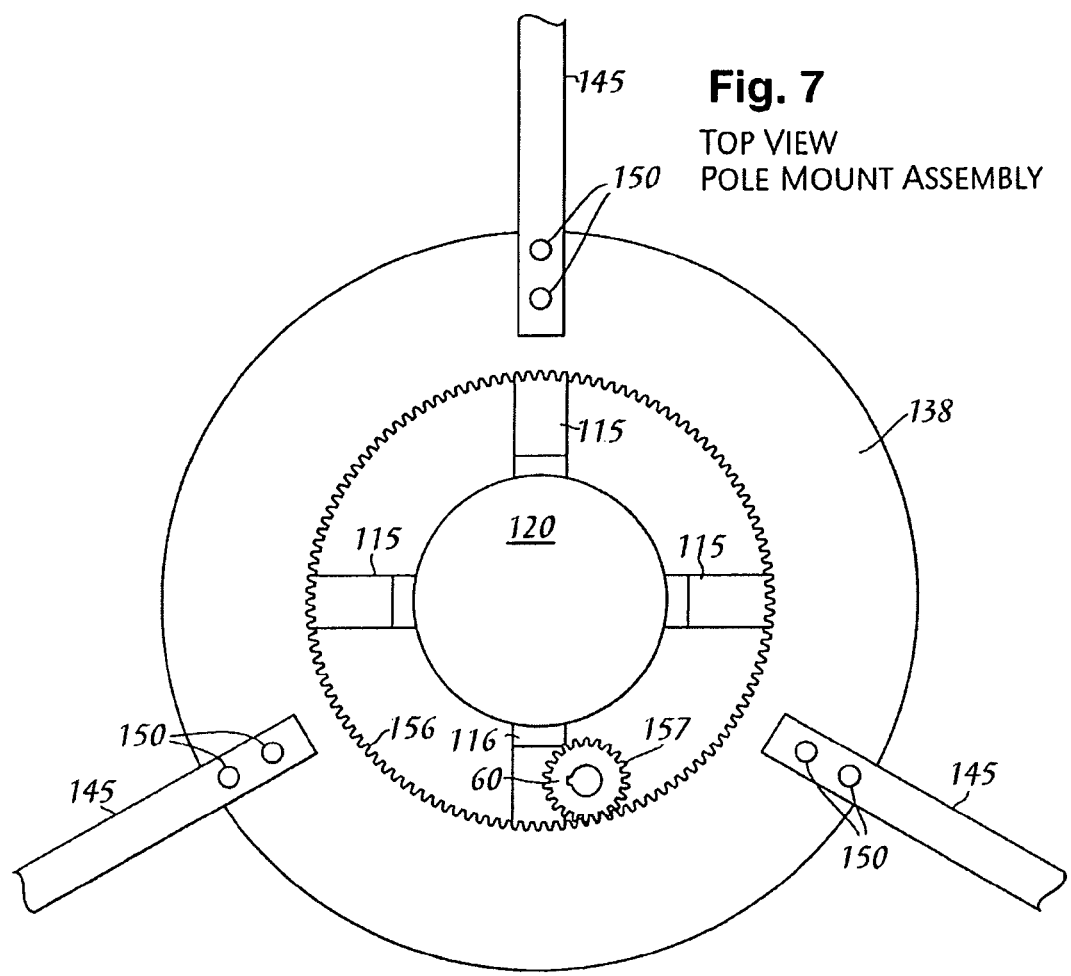
FIG. 7 is a top view of the pole mount assembly of FIG. 5 attached to the pole.

Referring to FIGS. 5, 6, and 7, one suitable embodiment of the pole mount assembly 15 is depicted. As will be described in more detail hereinafter, the pole mount assembly 15 permits the mounting of the wind generators 12 on utility poles 4 or adjacent poles 26, respectively, so that the wind rotor assembly 18 of the wind turbine generator 12 rotates about the axis of the utility poles 4 or adjacent poles 26, respectively. The wind turbine generator 12 may also be mounted on the pole without any material damage or modification to the pole.

The pole mount assembly 15 contemplates using appropriately sized screws 110 to attach three identically shaped and pre-drilled metal mounting bar assemblies 115 vertically to a pole 120 spaced at successive right angles. A fourth uniquely-shaped and pre-drilled metal mounting bar assembly 116 is mounted below a turbine race assembly 35 to create four spaced metal mounting bar assemblies 115 and 116 screwed into pole 120.

Flexible metal bands 125 are affixed around pole 120 and over the metal mounting bar assemblies 115 and 116 to further secure the pole mount assembly 15. The horizontal section of the metal mounting bar assembly 115 is the turbine race assembly platform 130, which is supported by angular support sections 118. The horizontal section of the metal mounting bar assembly 116 is the turbine race assembly platform 117. The turbine race assembly platforms 130 and 117 are pre-drilled with elongated holes to allow for fine tuning and proper installation of the turbine race assembly 35.

The turbine race assembly 35 is circular in shape, and includes a bottom race disk 136, a set of stationary roller bearings 137, and a top race disk 138. The turbine race assembly 35 is sized to fit around pole 120 with a clearance from the inside edge of the top race disk 138 equally around the circumference of pole 120 in order to accommodate positioning of a drive shaft 60 and alignment of the turbine race assembly 35. The bottom race disk 136 is attached to the turbine race assembly platforms 130 and 117 with two bolts 140 on each metal mounting bar assembly 115 and 116 and is therefore stationary.

The turbine race assembly 35 may be installed in one piece or may be installed in multiple pieces. An example is where the pole 120 has wires above and a single turbine race assembly 35 cannot be inserted over the top of pole 120. Two or more sections of the turbine race assembly 35 may be installed by bolting or locking together multiple pieces of turbine race assembly 35, and then securing them to the turbine race assembly platforms 130 and 117.

A set of stationary roller bearings 137 is fitted between a bottom race disk 136 and a top race disk 138. The top race disk 138 spins around pole 120 because it is attached to multiple wind turbine arms 145 with two metal bolts 150 which move when the wind blows the wind turbine blades (which are not shown since they can be of many varied configurations).

The top race disk 138 has gear teeth 156 on its inside edge which interlock with gear teeth 155 and 157 mounted on drive shaft 60 at a ninety degree angle.

Drive shaft 60 is fastened in multiple places on the metal mounting bar assembly 116 with adjustable metal clamps and eyelets 170; drive shaft 60 extends downward and interlocks gear teeth 155 with generator drive shaft gear teeth 165 at a ninety degree angle.

A generator (75) is fastened with bolts (180) to turbine race assembly platform 117. The generator 75 is also fastened with bolts 180 to an appropriately sized platform 121 supported by angular support section 119 to accommodate the size and weight of generator 75.

In securing the pole mount assembly to the pole, the three metal mounting bar assemblies 115 and the one uniquely shaped and pre-drilled metal mounting bar assembly 116 are secured to pole 120 at the selected height creating a level, stationary base. The flexible metal bands 125 are affixed tightly over the metal mounting bar assemblies 115 and 116 around pole 120 to further secure the pole mount assembly 15. The turbine race assembly 35 is bolted to the turbine race assembly platforms 130 and 117, respectively. The drive shaft 60 is fastened to the vertical member of uniquely shaped metal mounting bar assembly 116 with adjustable metal clamps and eyelets 170 so that its gear teeth 157 interlock with the gear teeth 156 attached to the top race disk 138 and gear teeth 155 interlock with gear teeth 165 attached to the generator 75. The generator 75 is mounted on the unique metal mounting bar assembly 116 above and below with multiple metal bolts 180.

In operation, the wind blows and moves the turbine blades and support arms 145 causing the top race disk 138 of the turbine race assembly 35 to spin around the vertical axis of the pole 120 Due to the rotation of disk 138, inner gear teeth 156 (which engage upper gear teeth 157 of the shaft 60) rotates the draft shaft 60. In turn, via engagement of lower gear teeth 155 of drive shaft 60 with the gear teeth 165 of the shaft of the electric generator 75, the drive shaft 60 spins the generator's drive shaft, thereby causing the generator 75 to produce low voltage electrical power output.

Figure 8:
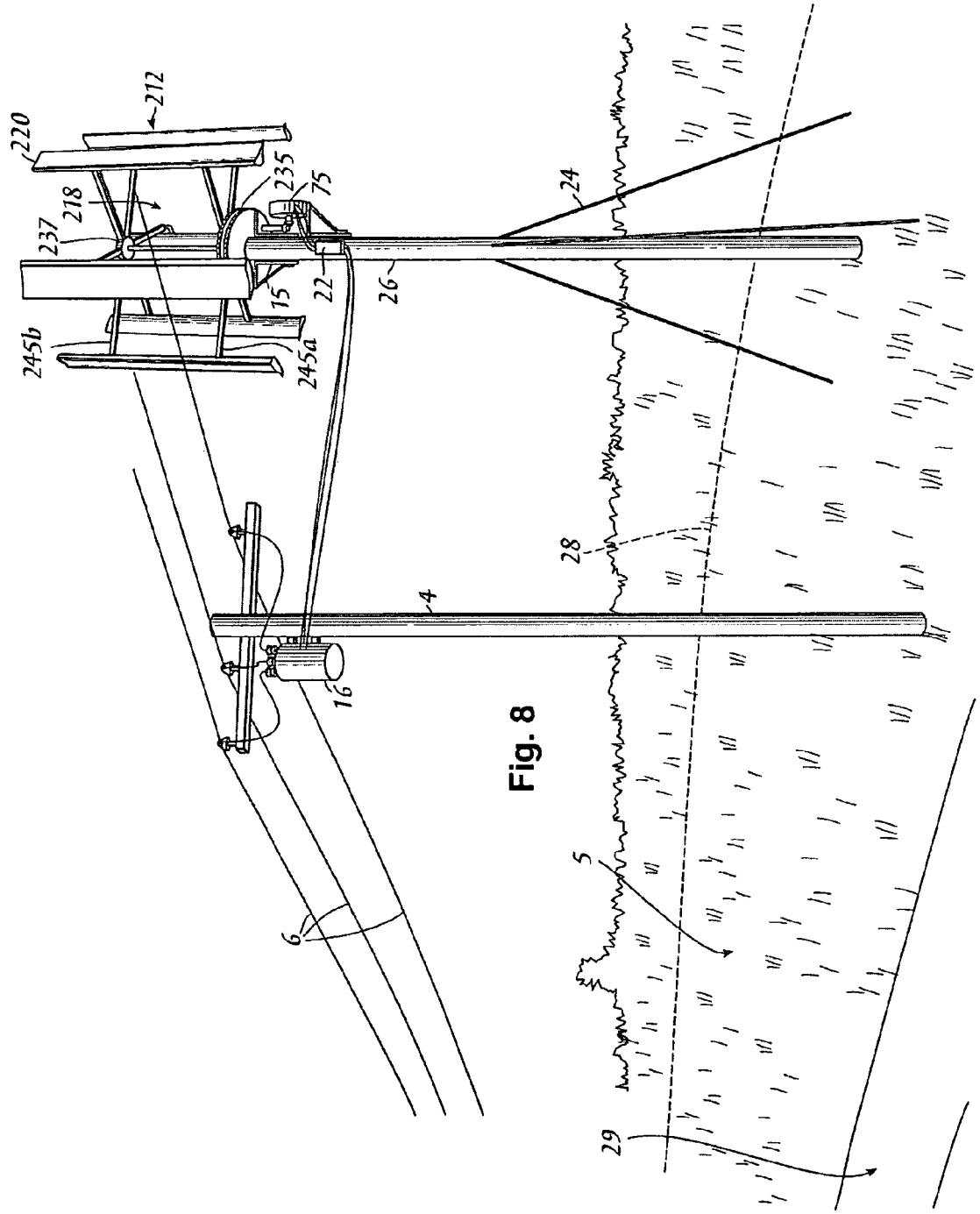
FIG. 8 is a perspective illustration of an alternative embodiment of a wind turbine generator of the distributed electric generation system wherein the wind turbine generator has a five blade, cage type rotor assembly which is mounted on a pole adjacent to the utility pole of the electrical distribution system with a different mounting configuration.

In FIG. 8, an alternative embodiment of a suitable wind turbine generator 212 that may be used in connection with the distributed electric generation system of the present invention is depicted mounted on a pole 26 adjacent a utility pole 4. The wind turbine generator 212 may have a wind rotor assembly 218 with five blades 220. A suitable five blade VAWT wind turbine generator is the Gyro 10 kW wind turbine generator made by Four Seasons Windpower LLC of Medina, Ohio. This wind turbine generator has a cut-in wind speed of 7.5 mph. Another suitable five-blade wind turbine generator is the PK10 10 kW wind turbine generator manufactured by Shanghai Aeolus Wind Technology Company, Ltd. of Shanghai, China.

An alternative blade supporting structure for the alternative rotor assembly 218 may also be used in the wind turbine generator 212. For example, a lower wind turbine arm 245a connected to the lower end of a blade 220 of the rotor assembly 218 for providing a mechanical support for the blade 220 may be connected to a lower race assembly 235 and an upper wind turbine arm 245b connected to the upper end of a blade 220 may be connected to an upper race assembly 237 for providing additional mechanical support. For this type of alternative wind rotor assembly, a second pole mount assembly 215 may be used to secure the upper race assembly 237 around the pole 26. This second pole mount assembly may be a modified version of the lower pole mount assembly 15, which has been previously described in connection with another embodiment in that the upper pole mount assembly need not have a drive shaft mechanism 60 for transferring the rotational energy from the wind rotor assembly to the electric generator.

A wide range of advantages results from the present invention, including locally produced energy, little energy wastage, and reduced energy costs. The distribution generation system 10 uses less expensive, small-wind turbines on already existing "geography"—utility poles on existing right-of-way—and distributes energy over a utility company's existing MV distribution lines. By installing pole-mounted small wind generators on miles and miles of utility poles in prairies, deserts, and open agricultural land with good wind exposure, utility companies will inexpensively create distributed renewable energy electric generation systems or Linear Wind Farms that locally produce supplemental clean, renewable energy.

Further specific advantages of this energy distribution system include several transmission, cost and regulatory advantages over the installation and operation of "big wind" farms.

Transmission Advantages
1) No new transmission lines needed. Distributed energy on utility poles is generated and consumed locally, avoiding the expensive new transmission lines needed by big wind farms and other outlying renewable energy production sites such as solar energy.
2) Power loss on transmission lines. When energy travels over transmission lines for long distances, approximately 7-10% of the energy is lost in transit. Energy that is locally generated and used will not suffer these same losses. Locally produced electricity is also better quality electricity—a more robust wave length—than electricity that has traveled farther from remotely located big wind generators.
3) Fewer power fluctuations. Big wind farms can experience significant power fluctuations due to wind loss in a specific location. Distributed linear wind farms are less likely to cause major unexpected fluctuations since all poles—thus all turbines—are not located in one concentrated place.
4) New revenue stream for the utility companies. With this system utility companies become energy generators, not just buyers. Once the costs of the systems are paid, utility companies will be producing low-cost energy.

Cost Advantages
1) Using existing right-of-way, property and distribution infrastructure. Utility companies already own millions of utility poles across America, as well as the distribution lines to distribute the energy. They can easily add poles in their existing right-of-way. Therefore, their investment will not have to include new infrastructure costs. It is estimated that new transmissions lines to support "big wind" farms would presently cost $1.5 million per mile.
2) Using new or existing utility poles. Since maintenance crews now use cherry-picker buckets to access poles and wires, the space between the ground and wire is valuable "real estate" and can be used for other purposes. Active turbines can be manually turned off while maintenance crews work on the power lines.
    i) Using existing poles lowers the installation cost to the utility company.
    ii) If the utility company prefers to use new adjacent poles 26 rather than install turbines on "live poles", these adjacent poles will usually be significantly less expensive than the metal poles currently being sold and used by small wind turbine manufacturers.
3) Land. By using their existing right-of-way, typically there is no need to purchase or lease additional land for the distributed electric generation system.
4) Less Energy Loss. Because locally generated electricity does not have to travel far, electricity general locally will not experience the additional expenses associated with the 7-10% line losses.

Reduced Regulatory Hurdles
Most regulatory hurdles have already been cleared, thereby avoiding expenses on real estate, zoning changes, taxes, permits, public meetings, etc.

It should be understood from the foregoing that the invention may be practiced, in one form, as a method for retrofitting an existing electrical distribution system to generate electrical power responsive to local winds. That is, existing utility poles, which support electric distribution power lines of the electrical distribution system, are retrofitted with respective wind turbine generators according to the arrangements described herein.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:
1. A distributed electric generation system, comprising:
a plurality of wind turbine generators for converting wind energy into low voltage alternating current electric power, wherein each of the wind turbine generators comprise:

a wind rotor having a vertical axis of rotation which rotates in response to wind;
a rotatable shaft driven by said wind rotor; and
an electric generator connected to the rotatable drive shaft for generating low voltage alternating current electric power in response to the rotation of the wind rotor by the wind;
a plurality of pole mount assemblies for mounting the plurality of wind turbine generators on a plurality of poles within the right of way of an electrical distribution system of an electric power grid,
wherein each of the pole mount assemblies is attachable about the axis of its respective pole so that the wind rotor of the wind turbine generator mounted thereon rotates about its respective pole and wherein the electrical distribution system distributes medium voltage from one or more electric power sources to consumers of the electric power and
wherein at least a portion of the poles are existing utility poles supporting the electric distribution power lines of the electrical distribution system and each of the pole mount assemblies is configurable to mount the wind turbine electric generator at a plurality of different longitudinal positions on the existing utility pole without having to remove the electric distribution power lines on such existing utility pole; and
a plurality of transformers electrically connecting the electric generators with the electrical distribution system for transforming the low voltage electric power generated by the electric generators into medium voltage alternating current electric power that is compatible with the existing electrical distribution system of the electric power grid.

2. The distributed electric generation system of claim 1, further comprising:
a plurality of inverters for adapting the electric power generated by the electric generators to the existing electrical distribution system.

3. The distributed electric generation system of claim 1, wherein the wind turbine generators are omni-directional, low-wind speed, vertical axis wind turbine generators having a rated power capacity up to 100 kilowatts.

4. The distributed electric generation system of claim 3, wherein the vertical axis wind turbine has three fixed blades.

5. The distributed electric generation system of claim 3, wherein the vertical axis wind turbine has five fixed blades.

6. A distributed electric generation system, comprising:
a plurality of wind turbine generators for converting wind energy into low voltage alternating current electric power, wherein each of the wind turbine generators comprise:
a wind rotor having a vertical axis of rotation which rotates in response to wind and that
comprises a turbine race assembly having a rotatable top race disk and a bottom race disk such that the top race disk spins when the wind rotor rotates in response to wind; and
a rotatable shaft driven by said wind rotor; and
an electric generator connected to the rotatable drive shaft for generating low voltage alternating current electric power in response to the rotation of the wind rotor by the wind;
a plurality of pole mount assemblies for mounting the plurality of wind turbine generators on a plurality of poles within the right of way of an electrical distribution system of an electric power grid
wherein each of the pole mount assemblies is attachable about the axis of its respective pole so that the wind rotor of the wind turbine generator mounted thereon rotates about its respective pole,
wherein the electrical distribution system distributes medium voltage from one or more electric power sources to consumers of the electric power, and
wherein each pole mount assembly comprises a turbine race assembly platform attachable about the axis of the pole at a plurality of different longitudinal positions from the ground for supporting the turbine race assembly so that the top race disk of each wind rotor rotates around its respective pole; and
a plurality of transformers electrically connecting the electric generators with the electrical distribution system for transforming the low voltage electric power generated by the electric generators into medium voltage alternating current electric power that is compatible with the existing electrical distribution system of the electric power grid.

7. The distributed electric generation system of claim 6, wherein at least a portion of the poles are existing utility poles supporting electric distribution power lines of the electrical distribution system and the pole mount assemblies are used to mount the respective wind turbine generators on the existing poles at locations between the ground and the existing power lines so that the rotating wind rotors do not come into contact with either the electric distribution lines or the ground wherein the respective wind turbine generators can be mounted on their respective utility poles without any modification of the pole other than modifications associated with the process of mounting the wind turbine generator on the existing pole without removing the existing power lines.

8. A distributed electric generation system, comprising:
a plurality of wind turbine generators for converting wind energy into low voltage alternating current electric power, wherein each of the wind turbine generators comprise:
a wind rotor having a vertical axis of rotation which rotates in response to wind;
a rotatable shaft driven by said wind rotor; and
an electric generator connected to the rotatable drive shaft for generating low voltage alternating current electric power in response to the rotation of the wind rotor by the wind;
a plurality of pole mount assemblies for mounting the plurality of wind turbine generators on a plurality of poles within the right of way of an electrical distribution system of an electric power grid
wherein each of the pole mount assemblies is attachable about the axis of its respective pole so that the wind rotor of the wind turbine generator mounted thereon rotates about its respective pole,
wherein the existing electrical distribution system comprises existing utility poles supporting electric distribution power lines that distributes medium voltage from one or more electric power sources to consumers of the electric power, and
wherein at least a portion of the poles on which the pole mount assemblies are attachable are adjacent poles erected substantially vertically in the right of way adjacent to the existing utility poles that support the existing electric distribution power lines,
wherein at least a portion of the pole mount assemblies are used to mount at least a portion of the wind turbine generators on the respective adjacent poles adjacent the existing utility poles, and wherein the distance between each one of the adjacent poles and its respective existing utility pole is sufficient for each wind rotor to rotate without interfering with the existing electric distribution power lines or existing utility poles; and a plurality of transformers electrically connecting the electric generators with the electrical distribution system for transforming the low voltage electric power generated by the electric generators into medium voltage alternating current electric power that is compatible with the existing electrical distribution system of the electric power grid.

9. The distributed electric generation system of claim 8, wherein the wind turbine generators rotate around their respective adjacent poles at a suitable location between the ground and the existing power lines supported by the existing poles such that the rotating wind rotors do not come into contact with either the electric distribution lines or the ground.

10. The distributed electric generation system of claim 9, wherein at least one additional wind turbine generator is mounted at a suitable location at or near the top of the adjacent pole so that the rotating wind rotor does not come into contact with the electric distribution lines, the utility pole, or the first wind turbine generator mounted on the same adjacent pole.

11. The distributed electric generation system of claim 8, wherein the wind turbine generator is mounted at a suitable location at or near the top of the adjacent pole so that the rotation of the wind turbine rotor does not come into contact with either the electric distribution lines or the utility poles.

12. The distributed electric generation system of claim 8, wherein the wind turbine electric generator on the adjacent pole is electrically connected to the transformer on an existing utility pole.

13. A pole mount assembly for mounting, at a plurality of different longitudinal positions on a pole erected substantially vertically to the ground, a vertical axis wind turbine generator having a wind rotor, wherein the wind rotor comprises a turbine race assembly having a rotatable top race disk with gear teeth on its inside edge and a bottom race disk, a plurality of blades, and a plurality of support arms attached between respective ones of the plurality of blades and the top race disk such that the top race disk spins when the rotor rotates in response to wind energy, wherein the pole mount assembly comprises:

a turbine race assembly platform attachable about the axis of the pole at a plurality of different longitudinal positions from the ground for supporting the turbine race assembly;

a plurality of support sections for supporting the turbine race assembly platform;

a plurality of first attachments for securing the plurality of support sections to the pole; and a plurality of second attachments for securing the bottom race disk to the assembly platform.

14. The pole mount assembly of claim 13, further comprising:

a platform for supporting an electric generator for generating electric power in response to the rotation of the wind rotor by wind energy;

a support section for supporting the electric generator platform;

a plurality of third attachments for securing the electric generator platform to the pole;

a first drive shaft having gear teeth at a first and second end, wherein the gear teeth on the first end interlock with gear teeth of the rotatable top race disk and the gear teeth of the second end are configured to interlock with the gear teeth of a second drive shaft of the electric generator mounted on the platform; and wherein the first drive shaft rotates in response to the rotation of the top race disk of the wind rotor by wind energy for driving the second drive shaft, thereby causing the electric generator to generate electric power in response to the rotation of the wind turbine rotor by wind energy.

15. The pole mount assembly of claim 14, wherein the pole is an existing utility pole supporting electric distribution power lines of an electrical distribution system and the mounting assembly is used to mount the wind turbine generator on the existing utility pole at a location between the ground and the existing power lines such that the rotating wind rotor does not come into contact with either the electric distribution lines or the ground wherein the electric generator can be mounted on the utility pole without any modification of the pole other than modifications associated with the process of mounting the electric generator on the existing pole.

16. The mount assembly of claim 13 wherein the pole is an adjacent pole erected substantially vertically in the right of way adjacent to an existing utility pole that supports the existing electric distribution system and the mount assembly is used to mount the wind turbine generator on the adjacent pole adjacent the existing utility pole, wherein the distance between the adjacent pole and the existing utility pole is sufficient for the wind rotor to rotate without interfering with the existing distribution lines or existing utility pole.

17. The mount assembly of claim 16 wherein the wind turbine generator is mounted on the adjacent pole at a location between the ground and the existing power lines so that the rotating wind rotor does not come into contact with either the electric distribution lines on the existing utility pole or the ground.

18. The mount assembly of claim 17 wherein at least one additional wind turbine generator is mounted at a suitable location at or near the top of the adjacent pole so that the rotating wind rotor does not come into contact with the electric distribution lines, the utility pole, or the first wind turbine generator mounted on the adjacent pole.

19. The mount assembly of claim 17, wherein the wind turbine electric generator on the adjacent pole is electrically connected to a transformer on the existing utility pole.

20. The mount assembly of claim 16 wherein the wind turbine generator is mounted at a location at or near the top of the adjacent pole so that the rotating wind rotor does not come into contact with either the electric distribution lines or the existing utility pole.

21. A method for retrofitting an existing electrical distribution system having exiting utility poles supporting electric distribution power lines to generate electrical power responsive to wind, the method comprising:

mounting a wind rotor assembly of a wind turbine generator on an existing utility pole without removing the electric distribution power lines supported by the existing utility pole in a configuration wherein rotors of the wind rotor assembly are free to rotate around the existing utility pole, wherein mounting the wind rotor assembly includes positioning the wind rotor assembly at a location between the ground and the electric distribution power lines and supporting the wind rotor assembly at the location with a pole mount assembly, such that the rotating rotors do not come into contact with either the electric distribution lines or the ground;

mounting an electrical generator on the existing utility pole, wherein mounting the wind rotor assembly further includes rotatably mounting a drive shaft of the assembly to the existing utility pole; and connecting a shaft of the electrical generator to the drive shaft of the wind rotor assembly so when wind energy imparts rotation to the wind rotor assembly the wind rotor assembly transfers this energy via the drive shaft to the electric generator for generating electric power.

* * * * *